(12) United States Patent
Erdle et al.

(10) Patent No.: US 9,270,091 B2
(45) Date of Patent: Feb. 23, 2016

(54) MULTIPLE WRAPPED LAMINATED BUS BAR SYSTEM AND METHOD

(75) Inventors: Harvey B. Erdle, Rochester, NY (US); Jesse A. Erdle, Rochester, NY (US); Robert A. Norman, Jr., Rochester, NY (US)

(73) Assignee: ELDRE CORPORATION, Rochester, NY (US)

( * ) Notice: Subject to any disclaimer, the term of this patent is extended or adjusted under 35 U.S.C. 154(b) by 201 days.

(21) Appl. No.: 14/008,232

(22) PCT Filed: Mar. 30, 2012

(86) PCT No.: PCT/US2012/031541
§ 371 (c)(1),
(2), (4) Date: Jan. 28, 2014

(87) PCT Pub. No.: WO2012/135673
PCT Pub. Date: Oct. 4, 2012

(65) Prior Publication Data
US 2014/0151082 A1 Jun. 5, 2014

Related U.S. Application Data

(60) Provisional application No. 61/470,278, filed on Mar. 31, 2011.

(51) Int. Cl.
*H02G 5/00* (2006.01)
*H02B 3/00* (2006.01)
*H02B 1/20* (2006.01)

(52) U.S. Cl.
CPC .. *H02B 3/00* (2013.01); *H02B 1/20* (2013.01); *H02B 1/202* (2013.01); *H02G 5/005* (2013.01)

(58) Field of Classification Search
USPC ................ 174/72 B, 88 B, 99 B
See application file for complete search history.

(56) References Cited

U.S. PATENT DOCUMENTS

| | | | |
|---|---|---|---|
| 3,202,756 A | 8/1965 | Stanback | 174/99 |
| 3,346,687 A | 10/1967 | Giger et al. | 174/68 |
| 3,396,230 A | 8/1968 | Crimmins | 174/72 |
| 4,694,123 A * | 9/1987 | Massey | 174/117 FF |
| 4,867,696 A * | 9/1989 | Demler et al. | 439/212 |
| 7,102,256 B2 * | 9/2006 | Murakami | 307/147 |
| 2010/0025105 A1 | 2/2010 | Hirschfeld | 174/72 B |

FOREIGN PATENT DOCUMENTS

| | | |
|---|---|---|
| JP | 46/30102 | 10/1971 |
| JP | 46-35110 | 10/1971 |

(Continued)

OTHER PUBLICATIONS

Office Action issued in connection with corresponding Japanese Patent Application No. 2014-502847, dated Aug. 29, 2014 (including English translation).

(Continued)

*Primary Examiner* — Dhirubhai R Patel
(74) *Attorney, Agent, or Firm* — Kusner & Jaffe

(57) ABSTRACT

Disclosed in this specification is a multilayer, laminated busbar and a method for making the same. Two or more elongated conductors are stacked on top of each other to align their long and short edges. Portions of the surfaces of each conductor are covered with a continuous sheet of insulating material.

6 Claims, 11 Drawing Sheets

(56) References Cited

FOREIGN PATENT DOCUMENTS

| | | | |
|---|---|---|---|
| JP | 50-46968 | 5/1975 | ............... H01B 7/00 |
| JP | S63160019 | 10/1988 | ............... H02G 3/16 |
| JP | 8-251781 | 9/1996 | ............... H02G 5/06 |
| JP | H11262135 | 9/1999 | ............... H02G 3/16 |
| JP | 2003047128 | 2/2003 | ............... H01R 4/02 |
| JP | 2003047129 | 2/2003 | ............. H01R 12/28 |

OTHER PUBLICATIONS

European Search Report and Written Opinion issued in corresponding European Patent Application No. 12765936.5, dated Aug. 14, 2014.

Int'l Search Report from corresponding PCT/US2012/031541 (Form PCT/ISA/210); 3 pages.

* cited by examiner

MULTIPLE WRAPPED LAMINATED BUS BAR SYSTEM AND METHOD

CROSS-REFERENCE TO RELATED APPLICATIONS

This application claims priority to and the benefit of co-pending U.S. provisional patent application Ser. No. 61/470,278, filed Mar. 31, 2011, which application is incorporated herein by reference in its entirety.

TECHNICAL FIELD

The present invention relates to improved systems and methods of providing insulating dielectric layers in electrical power distribution systems, such as bus bars, and particularly those systems having multiple conductive elements.

BACKGROUND INFORMATION

Electrical power distribution systems, such as bus bars for example, are used in a variety of applications from smaller, low voltage, computer, electronic, and telecommunications systems to larger, higher voltage transportation systems such as trains and electric vehicles. Bus bars are generally comprised of one or more conductive layers, levels, or elements formed of a conductive material such as copper, brass, nickel, aluminum, and/or a suitable alloy for example, which may be plated, and one or more layers of dielectric or insulating material disposed proximate each conductive layer. The insulating material can be an epoxy, powder coating, and/or laminate thin film material which can be attached by a variety of methods including a heat press, for example, as is known in the art.

Referring to FIG. 1A, a prior art bus bar is shown having multiple conductive and insulating layers. The insulating layers are shown as sheets cut to approximately the shape of each alternating conductive layer. The open laminated construction shown in FIG. 1A does not provide for insulation of edges of the conductive elements, a general requirement for a bus bar to operate for its intended purpose.

Accordingly, several prior art methods of edge sealing have been developed including the pinched or molded/sealed construction shown in FIG. 1B. The bus bar of FIG. 1B provides insulating layers which do not account for corners, require additional material, cost, labor, and time to produce, and result in bus bars of increased size due to extension of the laminate at the pinched location.

Referring to FIGS. 1C and 1D, edge sealing can be provided by insertion of an insulating material such as a glass, including and not limited to flame resistant 4 (FR4) epoxy-woven glass. FIG. 1D shows a hardened epoxy resin at the edges The process of edge sealing with epoxy requires increased material and substantial labor to insert the epoxy and time to cure the epoxy and is therefore not a cost-effective method of bus bar manufacture.

Referring to FIG. 1E, a powder-coated multilayer bus bar is shown. Epoxy powder coating can be used to coat both the one or more surfaces of the conductive layers and the edges as is known in the art. However, powder coating is time-intensive, can require multiple applications, and results in insulating layers of uneven thickness, a significant disadvantage.

Moreover, the bus bars shown in FIG. 1A-E are of simple, alternating layer construction without secondary features such as flangeconductors or terminations, for example. Providing one or more insulating layers for bus bars, particularly those with multiple layers, having secondary features is particularly challenging using any of the above.

Accordingly, there is a need in the art for an efficient method of bus bar fabrication that provides for increased effectiveness of the dielectric insulation between conductive layers, particularly in multiple conductive layer applications, while reducing manufacturing cost and time.

SUMMARY OF THE INVENTION

Disclosed in this specification is a multilayer, laminated busbar and a method for making the same. Two or more elongated conductors are stacked on top of each other to align their long and short edges. Portions of the surfaces of each conductor are covered with a continuous sheet of insulating material.

BRIEF DESCRIPTION OF THE DRAWINGS

The present invention is disclosed with reference to the accompanying drawings, wherein.

Figure 1A:
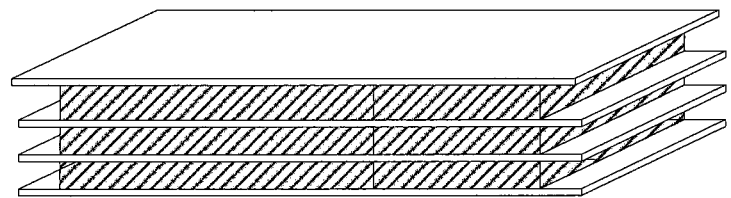
FIG. 1A is a front perspective view of an exemplary prior art bus bar having open ended multiple alternating conductive and insulating layers.

It will be appreciated that for purposes of clarity and where deemed appropriate, reference numerals have been repeated in the figures to indicate corresponding features.

DETAILED DESCRIPTION

Figure 2A:
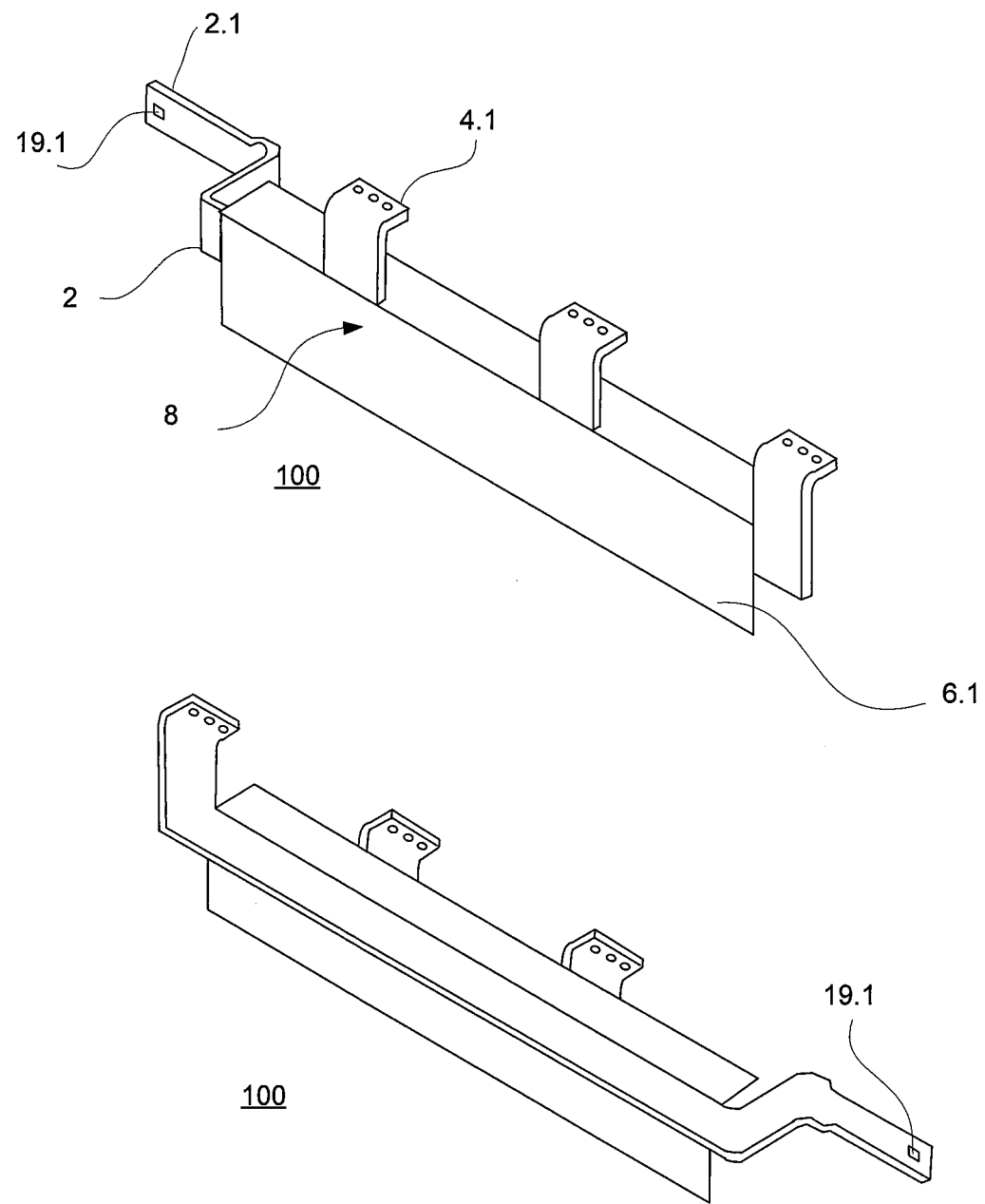
FIG. 2A shows alternate perspective views of a subassembly of one embodiment of the present invention at a first step of formation.
Figure 2B:
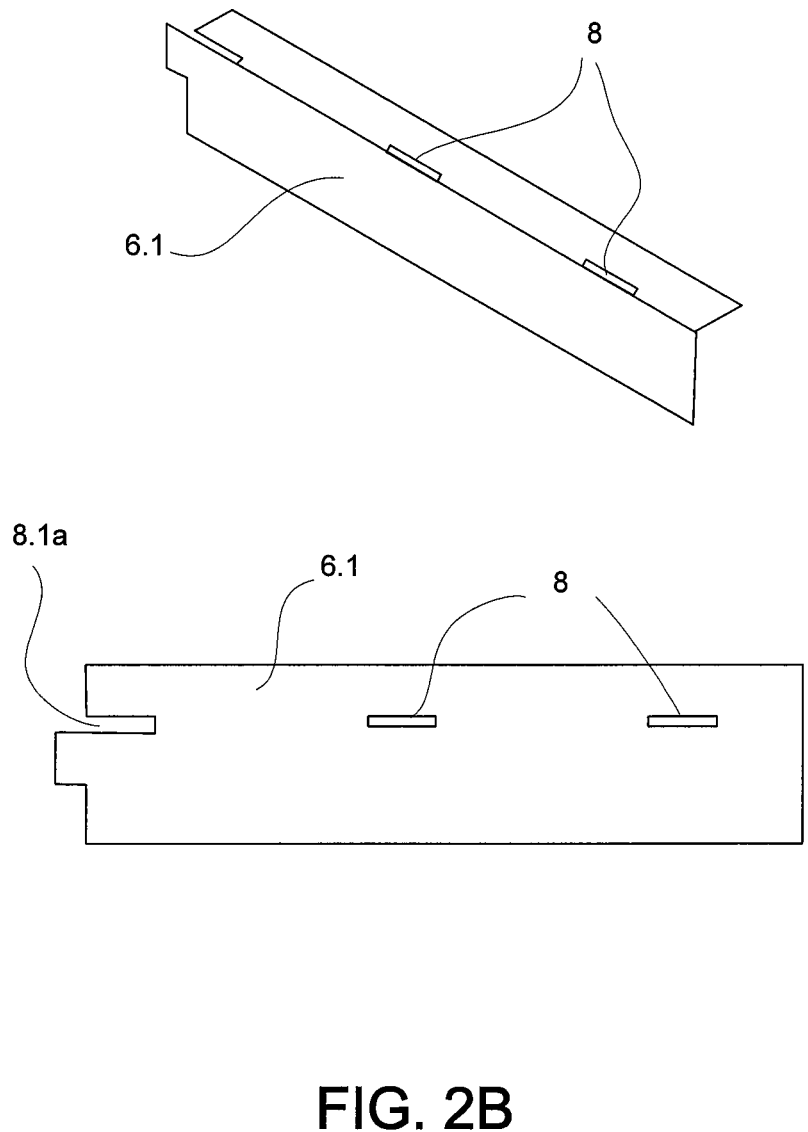
FIG. 2B shows plan and perspective views of a first sheet of an insulating layer for the first subassembly.

Referring to FIGS. 2A, 2B a first subassembly 100 includes a conductive member 2, such as a copper conductor. The conductive member 2 has an L-shaped end, 2.1 with a aperture 19.1, and an insulating layer 6.1 formed from a roll or sheet of any suitable thin film dielectric insulation such as a thermoplastic, polyethylene terephthalate (PET), and/or polyvinyl fluoride material, for example. The conductive member 2 can include secondary features such as one or more flanges 4.1. A continuous sheet of insulating material that provides the insulating layer 6.1 is shown in detail in FIG. 2B. The insulating layer 6.1 preferably includes one or more holes 8 or slots 8a for receiving one or more secondary features such as the flanges 4.1. Accordingly, in the subassembly 100 flanges 4.1 are placed through the holes 8.1 and slot 8.1 a in the insulating layer 6.1 wherein the holes are disposed approximately one width of the conductive element from the edge of the laminate material.

Figure 2C:
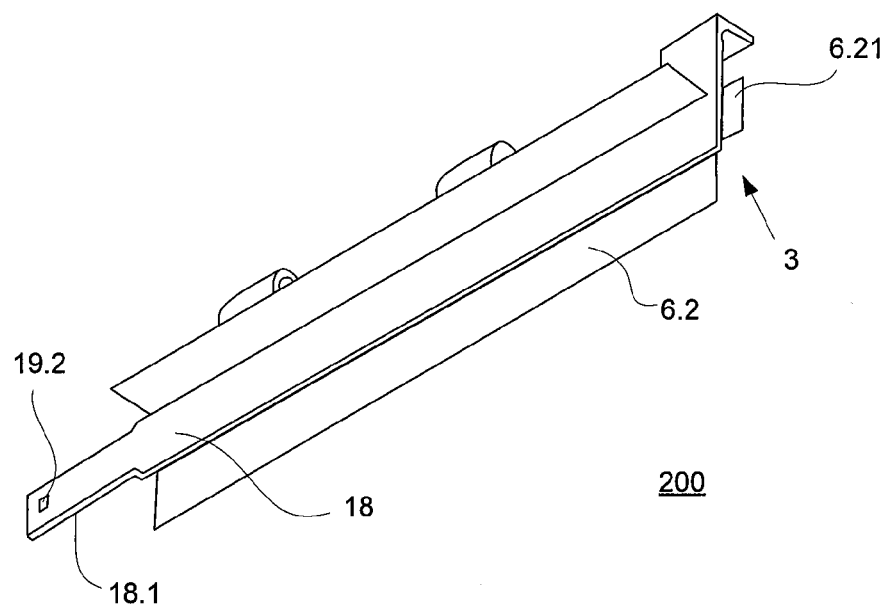
FIG. 2C shows a perspective view of a second subassembly of one embodiment of the present invention also at a first step of formation.
Figure 2D:
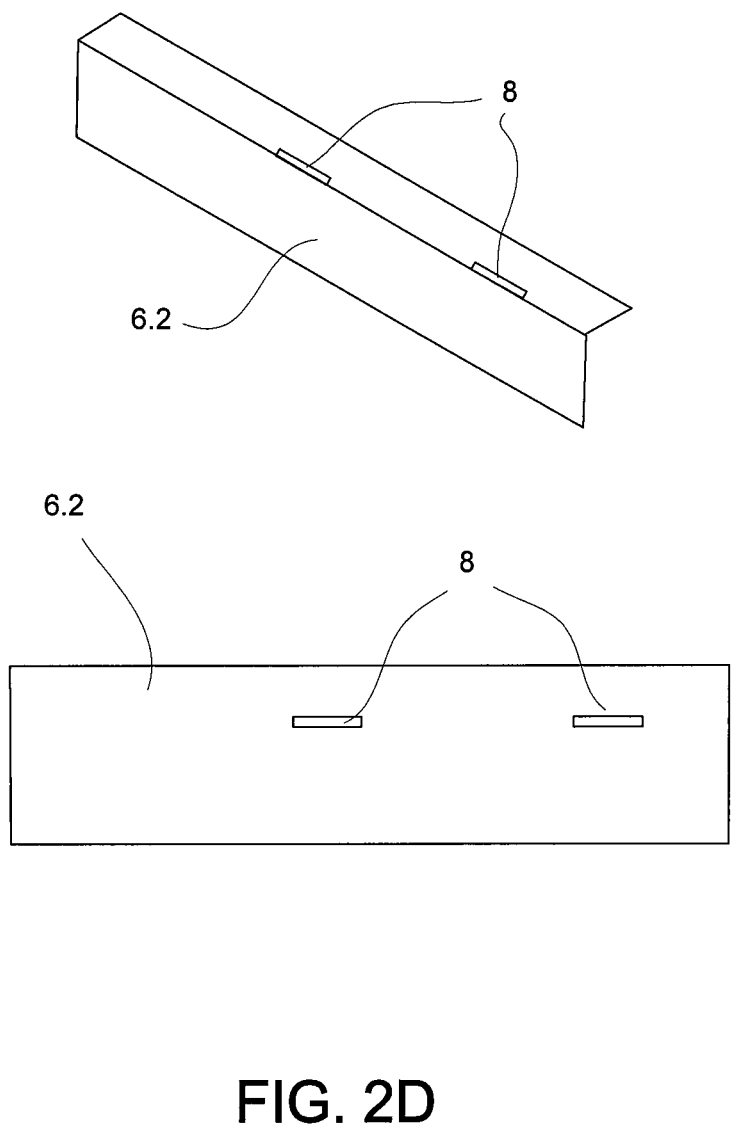
FIG. 2D shows plan and perspective views of a first sheet of an insulating layer for the second subassembly.

Referring to FIGS. 2C, 2D, there is shown a second subassembly 200 that includes a conductive member 18 with a straight end 18.1 and aperture 19.2. Another insulating layer 6.2 covers the conductor 18. Layer 6.2 is shown in detail in FIG. 2D and can be any suitable length or width and can be configured to have a portion 6.21 extend beyond one or more of the ends 3 of the conductive member 18 as shown in FIG. 2C for later closing the end of the conductor.

The insulating layers 6.1, 6.2 may be wrapped one or more times over their respective conductive member 2, 18 so that the conductive member has one or more layers with wrapped insulation. A sheet of insulating layer 6.1 or 6.2 may be serially wrapped over two or more conductive members. For example, two conductive members 18 can be serially wrapped with the same sheet of insulating layer 6.2 by first wrapping one conductive member 18 with the sheet of insulating layer 6.2, placing a second conductive member 18 on the wrapped conductive member 18 and wrapping the sheet 6.2 over the second conductive member. The first conductive member has two insulating layers on one side and a single layer facing the second conductive member. More conductive members may be added and likewise serially wrapped.

Figure 3:
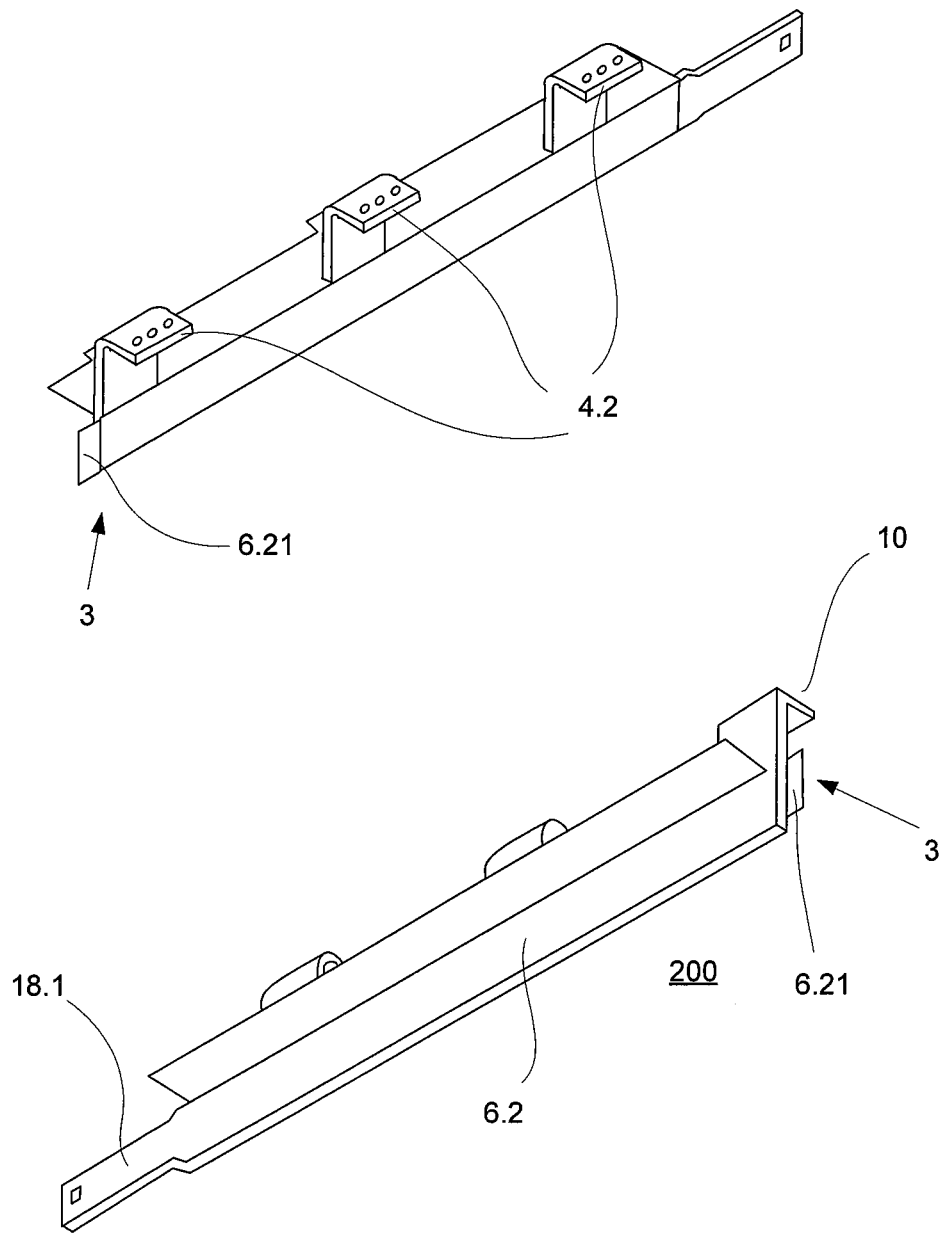
FIG. 3 shows two perspective views of the second subassembly.

The insulating layer 6.2 is wrapped tightly around the longitudinal edges of the conductive member 18 as shown in FIG. 3. Optionally, suitable glue can be applied to retain the insulating layer 6.2 in place while wrapping.

Figure 4:
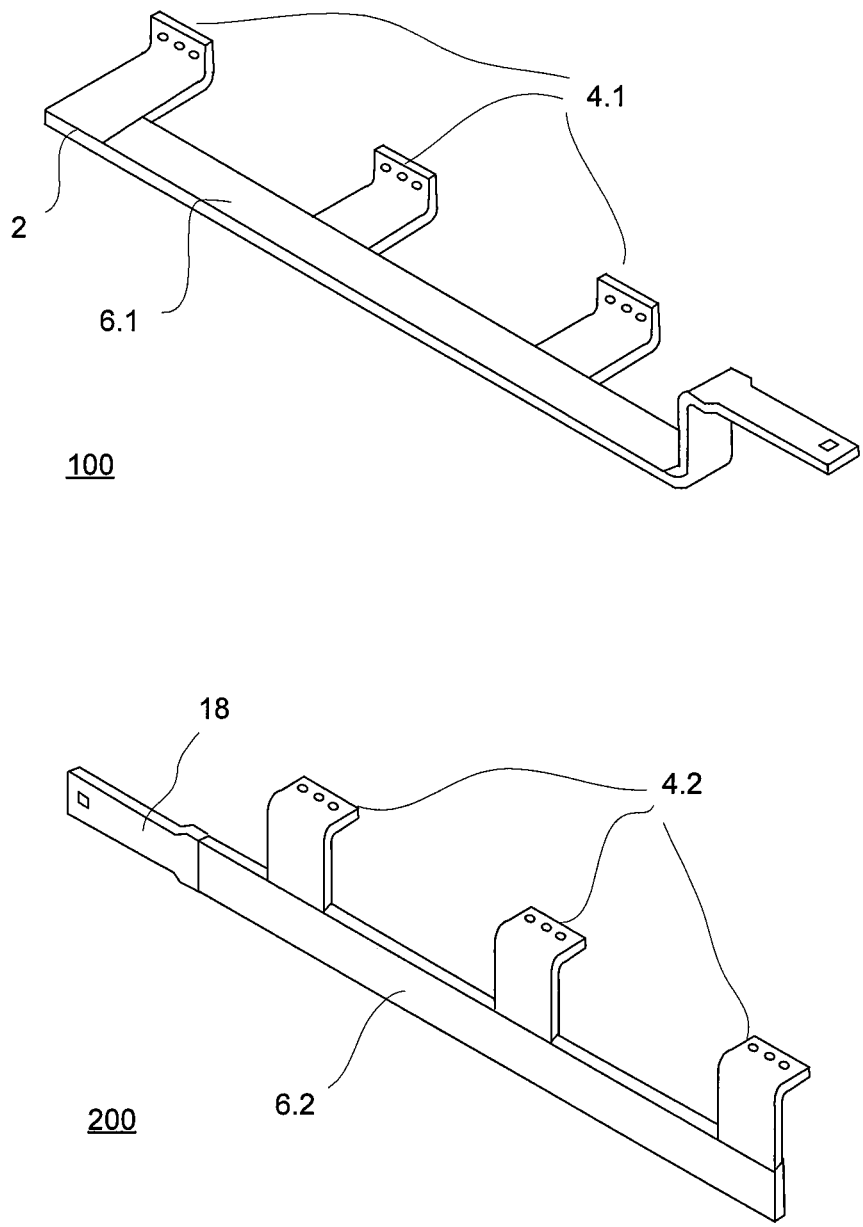
FIG. 4 shows the two subassemblies facing each other.
Figure 5:
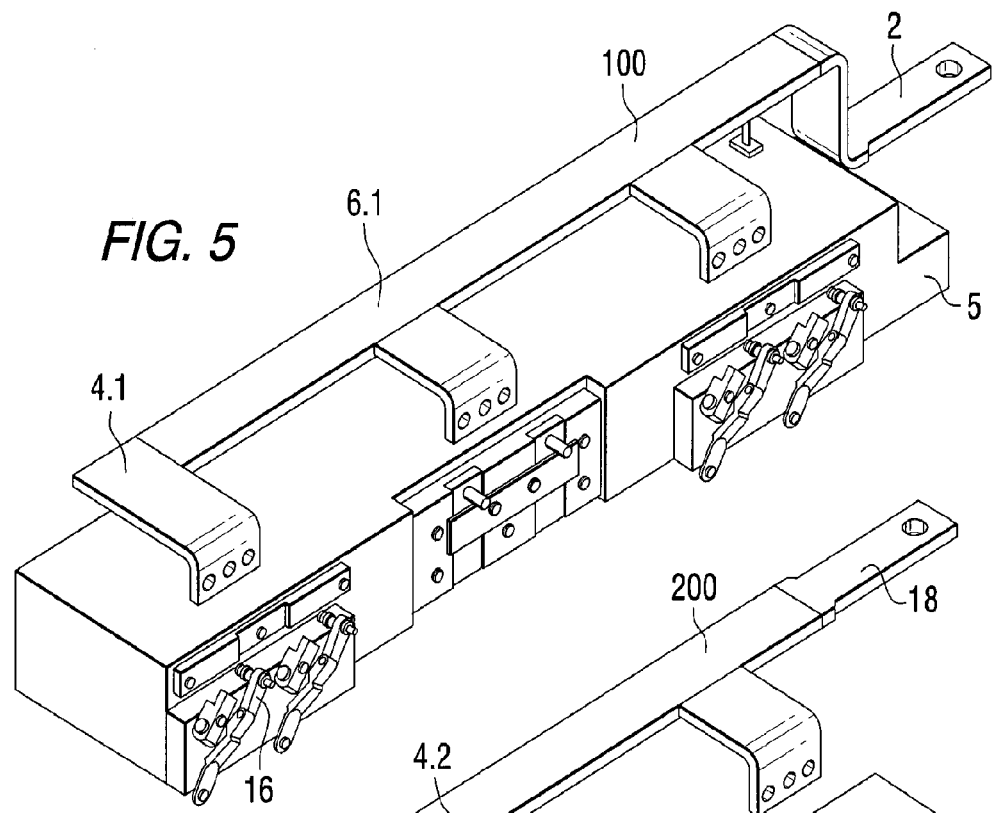
FIG. 5 is a perspective view of the first subassembly proximate a manufacturing fixture.

Referring to FIG. 4, the two subassemblies 100, 200 are shown with insulating layers 6.1 and 6.2 in position on each conductor 2, 18. Turning to FIG. 5, the first subassembly 100 is positioned in the manufacturing fixture 5 and held in place by one or more clamps 16. Each clamp 16 can be configured to receive the subassembly 100 including the wrapped conductive member 2 and its flanges 4.1. A single subassembly may be placed in a oven and treated with pressure and heat to fix the insulating layer 6.1 onto the conductive member 2.

Figure 6:
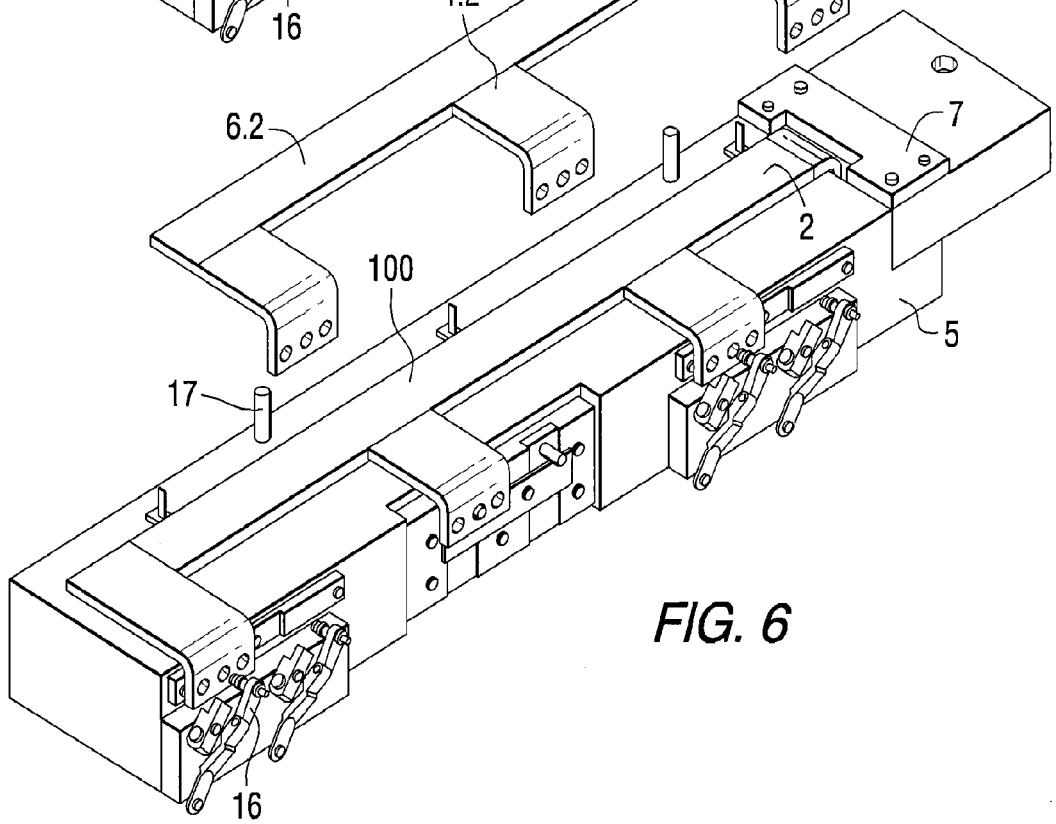
FIG. 6 is a perspective view of the second subassembly positioned proximate the manufacturing fixture.

Referring to FIG. 6, the two subassemblies are combined into a multiple conductive layer embodiment. The second subassembly 200 with conductive member 18 is wrapped with insulating layer 6.2, according to the steps identified above. It may include secondary features, such as flanges 4.2. Subassembly 200 is placed in fixture 5 proximate the first subassembly 100. The second subassembly 200 is also retained in the fixture 5 by one or more clamps 16. The subassemblies 100, 200 are further be retained in place in the fixture 5 by one or more slide blocks 7.

Figure 7:
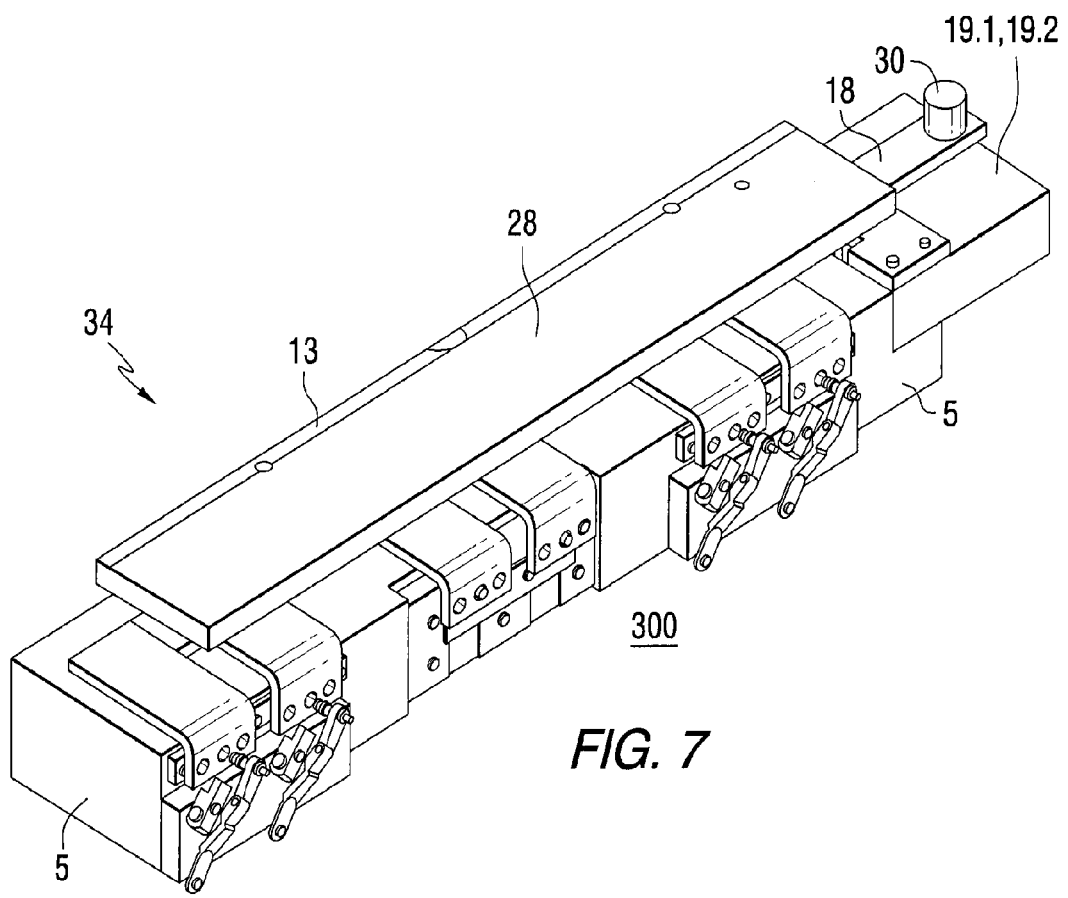
FIG. 7 is a perspective view of the two subassemblies positioned in the manufacturing fixture.
Figure 8:
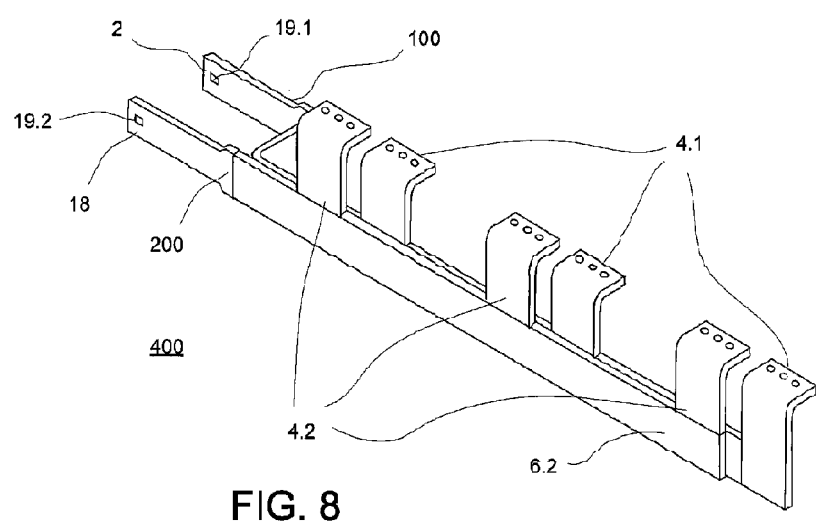
FIG. 8 is a perspective view of a multilayer bus bar assembly apparatus according to an embodiment of the present invention.

Referring to FIG. 7, a top plate 28 is placed on top of subassembly 200. The top plate 28 includes one or more apertures 13 configured to align with one or more fixture protrusions 17. To further retain the bus bar subassemblies 100, 200 in place, one or more pins 30 can be configured to extend through apertures 19.1, 19.2, as required, in one or more conductive members 2, 18, as shown in FIG. 8, to be received by the fixture 5. The fixture 5 is placed in a suitable heat press. Top plate 28 allows the heat press to put pressure onto the insulators and bond them together and also helps transfer and spread the heat evenly to the topmost insulating layer. The insulating layers 6.1, 6.2 include a thermal activated resin which bonds to the conductors 2, 18 under heat and pressure. The applied temperature and pressure varies depending upon the size of the bus bar and the type of material used for the insulting layer.

The entire assembly 300 including bus bar subassemblies 100, 200 and fixture 5 can then be placed in a heated press (not shown) where it is heated and pressurized to soften the insulating layers 6.1, 6.2 for a suitable time period to complete the bond and form one multilayer bus bar apparatus 400 as shown in FIG. 8. Finally, the multilayer bus bar apparatus 400 is removed from the heated press and cooled to room temperature before handling.

The multilayer, laminated busbar 400 has two elongated busbar conductors 2, 18 that are stacked on top of each other. Each busbar has a surface and is defined by two long edges separated at their opposite ends by two shorter edges. The busbar subassemblies 100, 200 are relatively thin compared to their respective lengths and widths. The surface of the conductive members 2, 18 are covered, respectively, with continuous sheets or layers 6.1, 6.2 of insulating material. The end 3 of busbar 100 has a portion 6.21 of the insulating layer on one of its short ends.

Accordingly, the present invention provides an efficient and cost-effective method for manufacturing a multilayer bus bar apparatus 400 including wrapping a thin film dielectric insulating material 6.1, 6.2 around selected surfaces of conductive members 2, 18, placing the combined assembly 300 in a heated press, heating the combined assembly 300 and applying pressure to plate 28 to bond the insulating layers 6.1, 6.2 thereby resulting in a multilayer bus bar apparatus 400 requiring minimal or no edge sealing.

Figure 1B:
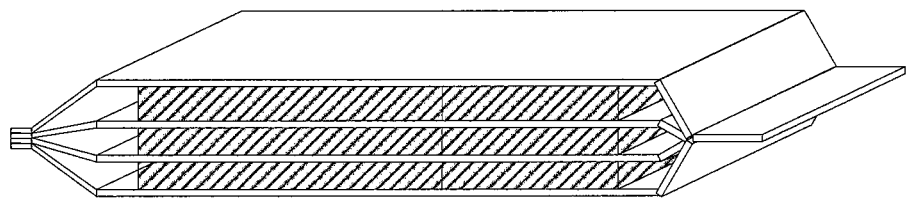
FIG. 1B is a front perspective view of an exemplary prior art bus bar having multiple alternating conductive and insulating layers sealed at one or more edges such as by pinching.
Figure 1C:
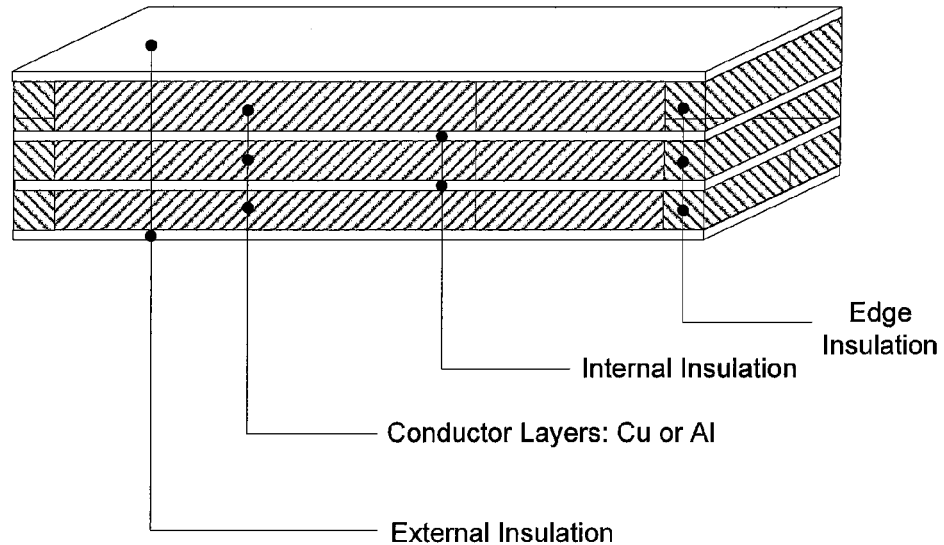
FIG. 1C is a front perspective view of an exemplary prior art bus bar having multiple alternating conductive and insulating layers sealed at one or more edges with an edge filling.
Figure 1D:
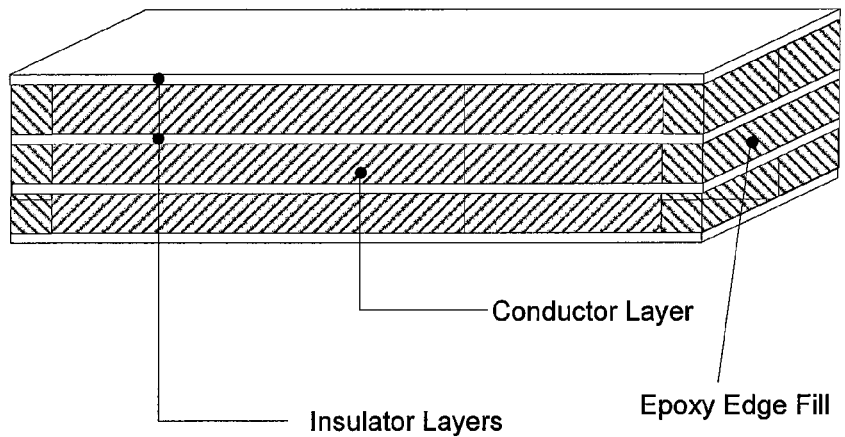
FIG. 1D is a front perspective view of an exemplary prior art bus bar having multiple alternating conductive and insulating layers sealed at one or more edges with an epoxy.
Figure 1E:
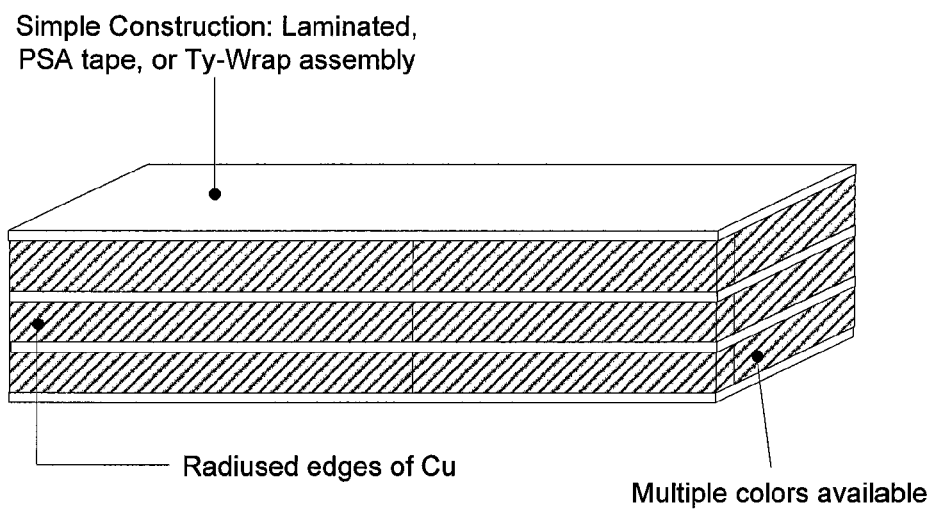
FIG. 1E is a front perspective view of an exemplary prior art bus bar having multiple alternating conductive and insulating layers formed by powder coating.

The examples of the embodiments of the invention include busbars and busbar subassemblies with one end that is wrapped or closed with the same continuous sheet of insulating material that covers the surface of the busbar. See, in particular, FIG. 2C where an end portion 3 of the continuous sheet of insulating material 6.2 wraps around a short end of the conductive member 18. The method and construction of the embodiments of the invention are thus different from the open laminated construction of the prior art example shown in FIG. 1A or the molded/sealed construction of FIG. 1B where conductive members are wrapped with different sheets of material on their opposite side. The embodiments of the invention are also different from the examples of prior art in FIGS. 1C, 1D and 1E because those prior art examples require filling the ends of the multilayer busbars with insulating material or epoxy or powder coating the busbars. Wrapping with a continuous single sheet of insulating material eliminates the step of filling the ends with insulating material and is less expensive than powder coating.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention

What is claimed is:

1. A method for making a multilayer, laminated bus bar comprising:
   providing two or more elongated bus bar conductors, each of said bus bar conductors having a surface defined by two long edges;
   wrapping each surface of each of said bus bar conductors and each long edge of each of said bus bar conductors with a continuous sheet of insulating material so as to cover the two or more bus bar conductors with the same sheet of insulating materials;
   stacking the bus bar conductors on top of each other; and
   applying heat and pressure to the bus bar conductors to fix the insulating material to the surfaces of each of said bus bar conductors and the long edges of each of the bus bar conductors.

2. The method of claim 1 wherein:
   at least one of said bus bar conductors has an elongated rectangular shape defined by the two long edges of one of said bus bar conductors and two short edges of one of said bus bar conductors and one or more flanges extend from one of the long edges of one of said bus bar conductors; and
   the sheet of insulating material has a corresponding opening or slot for each of said one or more flanges.

3. The method of claim 1 wherein:
   at least one of said bus bar conductors has an elongated rectangular shape defined by the two long edges of one of said bus bar conductors and two short edges of one of said bus bar conductors; and
   the method further comprising the step of overlapping at least one short edge of one of said bus bar conductors with a portion of the continuous sheet of insulating material on the surface of one of said bus bar conductors.

4. The method of claim 1 wherein:
   at least one of said bus bar conductors has an elongated rectangular shape defined by the two long edges of one of said bus bar conductors and two short edges of one of said bus bar conductors; and
   the method further is comprising the step of leaving at least one short edge of one of said bus bar conductors free from the wrapping with a portion of the continuous sheet of insulating material on the surface of one of said bus bar conductors.

5. A multilayer, laminated bus bar comprising:
   two or more elongated bus bar conductors, said bus bar conductors stacked on top of each other to align their long and short edges;
   each of said bus bar conductors has a surface defined by two long edges separated at their opposite ends by two shorter edges, said bus bar conductors being relatively thin compared to their respective lengths and widths; and
   each surface of each of said bus bar conductors and each long edge of each of said bus bar conductors is covered with a continuous sheet of insulating material, and said two or more bus bar conductors are covered with the same continuous sheet of insulating material.

6. The multilayer, laminated bus bar of claim 5 wherein at least one of said bus bar conductors has one short end covered with a portion of the continuous sheet of insulating material on the surface of one of the bus bar conductors.

* * * * *